US012500884B2

(12) United States Patent
Myers et al.

(10) Patent No.: US 12,500,884 B2
(45) Date of Patent: Dec. 16, 2025

(54) SECURE SESSION RESUMPTION

(71) Applicant: Apple Inc., Cupertino, CA (US)

(72) Inventors: Steven A. Myers, San Jose, CA (US); Sean P. Devlin, New York, NY (US)

(73) Assignee: Apple Inc., Cupertino, CA (US)

( * ) Notice: Subject to any disclaimer, the term of this patent is extended or adjusted under 35 U.S.C. 154(b) by 490 days.

(21) Appl. No.: 17/932,979

(22) Filed: Sep. 16, 2022

(65) Prior Publication Data

US 2023/0093749 A1    Mar. 23, 2023

Related U.S. Application Data

(60) Provisional application No. 63/247,255, filed on Sep. 22, 2021.

(51) Int. Cl.
*H04L 9/40* (2022.01)
(52) U.S. Cl.
CPC .................. *H04L 63/083* (2013.01)
(58) Field of Classification Search
CPC .................................... H04L 63/083
See application file for complete search history.

(56) References Cited

U.S. PATENT DOCUMENTS

| | | | | |
|---|---|---|---|---|
| 11,323,274 B1 * | 5/2022 | Bowen | ............... | H04L 9/3268 |
| 11,671,264 B1 * | 6/2023 | Cignetti | ............... | H04L 63/0823 |
| | | | | 713/156 |
| 2009/0251724 A1 * | 10/2009 | Nakajima | ............... | H04N 1/00233 |
| | | | | 358/1.15 |
| 2011/0131406 A1 * | 6/2011 | Jones | ............... | H04L 63/061 |
| | | | | 713/150 |
| 2012/0054491 A1 * | 3/2012 | Tippett | ............... | H04L 9/3213 |
| | | | | 713/168 |
| 2012/0174196 A1 * | 7/2012 | Bhogavilli | ............... | H04L 63/0428 |
| | | | | 726/22 |
| 2016/0127334 A1 * | 5/2016 | Bangole | ............... | H04L 67/12 |
| | | | | 713/171 |
| 2017/0201380 A1 * | 7/2017 | Schaap | ............... | H04L 63/083 |
| 2017/0214664 A1 * | 7/2017 | Birgisson | ............... | H04W 12/084 |
| 2017/0310665 A1 * | 10/2017 | Revell | ............... | H04L 9/0869 |

(Continued)

FOREIGN PATENT DOCUMENTS

WO    WO-2021016546 A1 *    1/2021    ............... H04L 9/50

OTHER PUBLICATIONS

Micali, et al., "Verifiable Random Functions," 11 pages.
Goldgerg, et al., "Verifiable Random Functions (VRFs)," May 17, 2021, 40 pages.

*Primary Examiner* — Darshan I Dhruv
(74) *Attorney, Agent, or Firm* — Kowert, Hood, Munyon, Rankin & Goetzel, P.C.; Paul T. Seegers; Dean M. Munyon (57) ABSTRACT

Techniques are disclosed relating to resuming a communication session. In some embodiments, a first computing device stores a session resumption token that includes metadata usable to resume a communication session. The first computing device provides a request to resume the communication session with a second computing device and receives, from the second computing device, an output of a verifiable random function (VRF) associated with the request. In response to the request, the first computing device performs a verification of the output and determines, based on the verification, whether to provide the session resumption token to the second computing device.

18 Claims, 6 Drawing Sheets

(56) References Cited

U.S. PATENT DOCUMENTS

| | | | |
|---|---|---|---|
| 2017/0366526 A1* | 12/2017 | Wood | H04L 63/061 |
| 2018/0123804 A1* | 5/2018 | Smith | H04L 9/3213 |
| 2018/0234257 A1* | 8/2018 | Kommireddy | H04L 9/321 |
| 2018/0262339 A1* | 9/2018 | Kazin | H04L 9/14 |
| 2018/0323977 A1* | 11/2018 | Hojsik | H04L 67/12 |
| 2018/0352417 A1* | 12/2018 | Butler | H04W 8/10 |
| 2019/0018951 A1* | 1/2019 | James | H04L 61/3025 |
| 2019/0074982 A1* | 3/2019 | Hughes | H04L 9/0863 |
| 2019/0238536 A1* | 8/2019 | Chilla | H04L 63/0823 |
| 2019/0253402 A1* | 8/2019 | Kärkkäinen | H04L 63/068 |
| 2019/0268156 A1* | 8/2019 | Delmas | G06F 21/31 |
| 2020/0162432 A1* | 5/2020 | Ludin | H04L 63/0807 |
| 2020/0233949 A1* | 7/2020 | Xia | H04W 12/08 |
| 2020/0259663 A1* | 8/2020 | Firsov | H04L 9/30 |
| 2020/0280855 A1* | 9/2020 | Avetisov | H04L 63/20 |
| 2020/0313878 A1* | 10/2020 | Wang | G06F 16/1734 |
| 2020/0320199 A1* | 10/2020 | Sheth | H04L 63/123 |
| 2020/0396089 A1* | 12/2020 | Guo | H04L 63/123 |
| 2021/0136157 A1* | 5/2021 | Kauppila | H04L 67/141 |
| 2022/0222347 A1* | 7/2022 | Sheth | H04L 9/0869 |
| 2022/0224534 A1* | 7/2022 | Wright | G06F 21/64 |
| 2022/0383325 A1* | 12/2022 | Hoffman | G06Q 20/4018 |
| 2023/0034169 A1* | 2/2023 | Ferenczi | H04L 9/0894 |

* cited by examiner

SECURE SESSION RESUMPTION

The present application claims priority to U.S. Provisional. Appl. No. 63/247,255, entitled "Secure Session Resumption," filed Sep. 22, 2021, the disclosure of which is incorporated by reference herein in its entirety.

TECHNICAL FIELD

This disclosure relates generally to communicating devices, and, more specifically, to resuming a communication session.

BACKGROUND

Various communication protocols may be employed to facilitate communications between devices. In many instances, devices implementing a given communication protocol may exchange an initial set of information to help establish a communication session between devices. This information may include configuration details, authentication information, etc.

DETAILED DESCRIPTION

Establishing a communication session between devices can consume time and resources as devices exchange information about the session to establish it. For this reason, devices may reuse information exchanged during one communication session to resume a subsequent session without having to resend the information. While both sides may choose to track state for established communication sessions by storing local copies of this exchanged information, in some instances, one of the participants may not want to maintain this information over time due to, for example, its limited storage resources, its high number of established communication sessions, etc. As one approach to avoiding maintaining state information, a participant may generate a token including this information and provide it to the other participant for storage. When the other participant later wants to resume a communication session, it can return the token to the token-generating participant, which can then extract the included information and use it to efficiently resume the communication session.

As a given token may include various information about the participants and their previously established session, these tokens may provide a way for one participant to track information about another participant—or a non-participant to track one or both participants. As one example, a user might browse various websites on their device, which may receive tokens from the servers providing those websites. Another device might later attempt to request these tokens in order to discern the particular websites that the user previously visited. As another example, a coffee shop may provide wireless charging pads to enable patrons to charge their phones. To set up a charging session, each charging pad may establish a communication session to negotiate charge rates and provide a respective token to expedite setting up subsequent charging sessions. When a user later tries to charge their phone, however, a given charging pad may try to request its token as well as any additional tokens generated by other charging pads in order to track how often a particular patron visits particular coffee-shop locations.

The present disclosure describes embodiments in which devices can securely resume communication sessions using session resumption tokens in a manner that takes device privacy into consideration. As will be described below in various embodiments, a first device may establish an initial communication session with a second device and receive a session resumption token that includes metadata usable to resume a subsequent communication session. In some embodiments, the first device may receive the session resumption token along with a verification key after both devices have mutually authenticated one another. When the first device later wants to resume a communication session, the first device may provide a corresponding session resumption request to the second device but hold off on initially providing the session resumption token. In response, the second device may provide an output of a verifiable random function (VRF) associated with the request, which, in various embodiments, may be verifiable using the verification key received during the initial communication session. The first device may then perform a verification of this VRF output and determine, based on the verification, whether to provide the session resumption token to the second device. Accordingly, if the verification is successful (e.g., indicating that the second device is likely the participant in the earlier communication session and the provider of the token), the first device may then provide the session resumption token, which can be used by the second device to resume the communication session. If, on the other hand, the verification fails, the first device may determine to not provide the token and may attempt to establish a new communication session without leveraging any exchanged information from the previously established communication session.

By providing the session resumption token conditional on a successful verification of a VRF output, the first device's privacy (and its user's privacy) can be better preserved as the first device can avoid providing the token to another device, which may not have been the original issuer of the token and may be attempting to track the first device using the token. In some embodiments, another advantage of this approach is that the device providing the VRF output can hold off on presenting more information about itself until after it can receive and verify the session resumption token—thus, allowing for its privacy to be better preserved as well.

Figure 1:
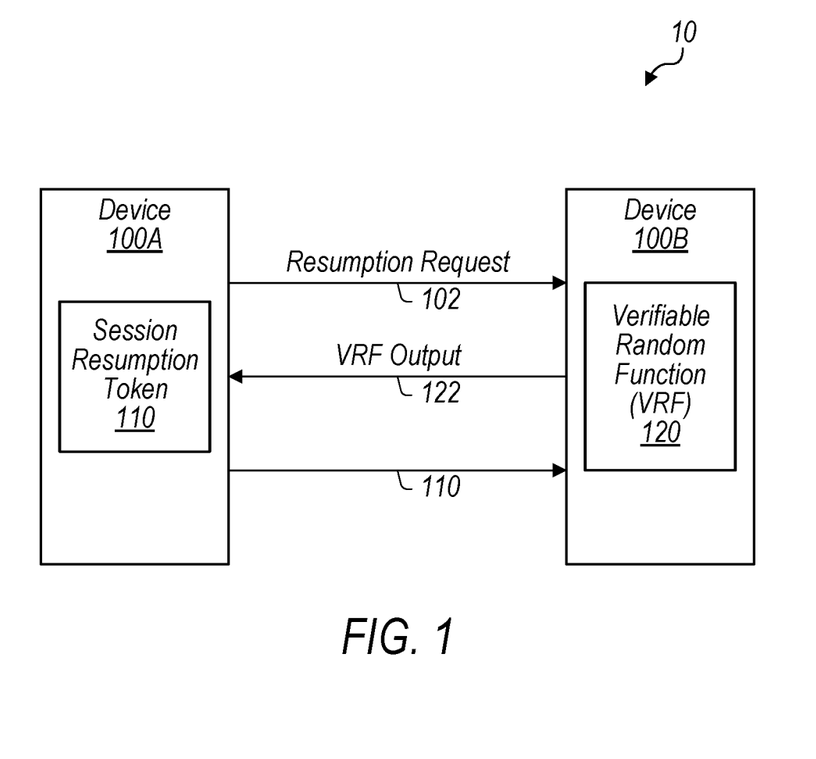
FIG. 1 is a block diagram illustrating an example of a system for securely resuming a communication session according to some embodiments.

Turning now to FIG. 1, a block diagram of a system 10 for securely resuming a communication session is depicted. In the illustrated embodiment, system 10 includes device 100A including a session resumption token 110. System 10 also includes device 100B, which includes a verifiable random function 120. In some embodiments, system 10 may be implemented differently than shown. For example, system 10 may include more devices 100, device 100A may include multiple tokens 110, device 100B may provide request 102, etc.

Device 100A, in various embodiments, is a computing device that wants to establish a communication session with another device such as device 100B. Device 100A may correspond to any suitable device that includes a wired or wireless communication interface such as a phone, tablet, laptop computer, desktop computer, server computing system, wearable device, internet of things (IoT) device, any of the various devices listed below for device 100B or listed below with respect to FIG. 5, etc. Device 100A may also interface with device 100B using any suitable communication protocol including wired protocols (such as universal serial bus (USB), Ethernet, Thunderbolt™, etc.) and wireless protocols (such as Wi-Fi®, Bluetooth®, near-field communication (NFC), Zigbee®, etc.). In some embodiments, device 100A may have a client-server relationship with device 100B in which device 100A is a client asking for some service provided by device 100B. For example, this service may be a service provided via the Internet such as a web service, streaming service, etc. As another example, this service may include providing power to device 100A via a wireless or wired connection. As yet another example, this service could be unlocking a door for a user of device 100A. In other embodiments, devices 100A and 100B may have a different relationship such as a peer-to-peer relationship.

Device 100B, in various embodiments, is another computing device participating in the communication session. Device 100B may also correspond to any suitable device such as keyboard, mouse, joystick, stylus, microphone, camera, display, printer, speakers, headphones, external solid-state drive (SSD), memory card, a USB power adapter, a Qi-complaint wireless charger, a battery pack, a physical portal for unlocking door, any of the various devices those listed above for device 100A or listed below with respect to FIG. 5, etc. As part of establishing a communication session, devices 100A and 100B may exchange various information with one another. In some embodiments, this information includes one or more negotiated configuration parameters that affect how the communication session is implemented—e.g., that the session will use Transport Layer Security (TLS) v1.3, use elliptic-curve keys established using Diffie-Hellman, etc. In some embodiments, this information includes authentication information such as authentication credentials (e.g., usernames, passwords, etc.), public key certificates, etc. In some embodiments, this information includes cryptographic information to secure the session such as components of a Diffie-Hellman exchange, cryptographic keys, key material for deriving cryptographic keys, etc. As exchanging this information for each session establishment consumes time and resources, in some embodiments, device 100B may preserve, at least, some of this information in a session resumption token 110, which it may provide during the initial communication session to device 100A for storage and subsequent use. As noted above, however, the information included in tokens 110 may allow for the potential tracking of devices 100A and/or 100B. To better preserve user/device privacy, devices 100A and 100B may incorporate a verifiable random function 120 into their session resumption exchange.

Verifiable random function (VRF) 120, in various embodiments, is a keyed function that produces a verifiable, pseudo-random output 122 unique to a given input. To facilitate performance of VRF 120 and verification of a corresponding output 122, device 100B may initially generate an asymmetric key pair having a private/secret key and a public/verification key, which, in some embodiments, may be Rivest Shamir Adleman (RSA) keys or elliptic-curve (EC) keys. Device 100B may use the secret key to apply VRF 120 to an input, which, as will be discussed with FIG. 3, may include a pair of nonces (or other information) exchanged beforehand. In some embodiments, the corresponding output 122 produced by VRF 120 may include a hash value produced by applying a hash function to the input and may also include a corresponding proof value produced by applying a proof function to the input. For example, in some embodiments, this hash value and corresponding proof may be determined using the respective functions VRF_hash and VRF_prove as discussed in "Verifiable Random Functions (VRFs)" (S. Goldberg, L. Reyzin, D. Papadopoulos, and J. Vcelak, Internet Draft, draft-irtf-cfrg-vrf-09, May 2021); however, in other embodiments, VRF 120 may be implemented differently.

In various embodiments, to enable device 100A to verify a VRF output 122 received during a session resumption, device 100B may provide the generated public/verification key during the initially established communication session, so that the later resumption can leverage the trust established between devices during this earlier session. When device 100A returns later to resume a communication session with device 100B, device 100A may provide a request 102 to resume a communication session with device 100B but does not yet provide its stored session resumption token 110. In response, device 100B uses its secret key and VRF 120 to generate a VRF output 122, which device 100B then provides to device 100A. Device 100A may then perform a verification of output 122 using the verification key received earlier. If the verification of output 122 is successful, device 100B may determine that device 100A is likely trustworthy as device 100B likely possess the corresponding secret key and thus is the other participant in the earlier established communication session, which may have also been previously authenticated as part of the establishment of this earlier session. As a result, device 100A may then determine to provide its stored session resumption token 110 including metadata usable by device 100B to resume a communication session with device 100A. If the verification of a VRF output 122 fails, device 100A may determine to not provide token 110 and may request that device 100B establish a new communication session independent of any previously established session.

As noted above, using VRF 120 in this manner may afford device 100A some level of privacy as device 100A can avoid providing its token 110 if device 100B is unable demonstrate its trustworthiness by providing a valid VRF output 122. If device 100B is able to demonstrate trustworthiness, both devices 100A and 100B get the benefit of a more efficient session resumption exchange than having to establish a communication session from scratch. Additionally, device 100B may, in some embodiments, verify a received session resumption token 110 in order to determine whether device 100A is trustworthy before, for example, device 100B may reveal privacy sensitive information about itself to device 100A.

As will be discussed next with FIG. 2, in various embodiments, device 100A may cache multiple session resumption tokens 110 received from multiple devices 100B over time and use a given VRF output 122 from a device 100B to look up its corresponding token 110.

Figure 2:
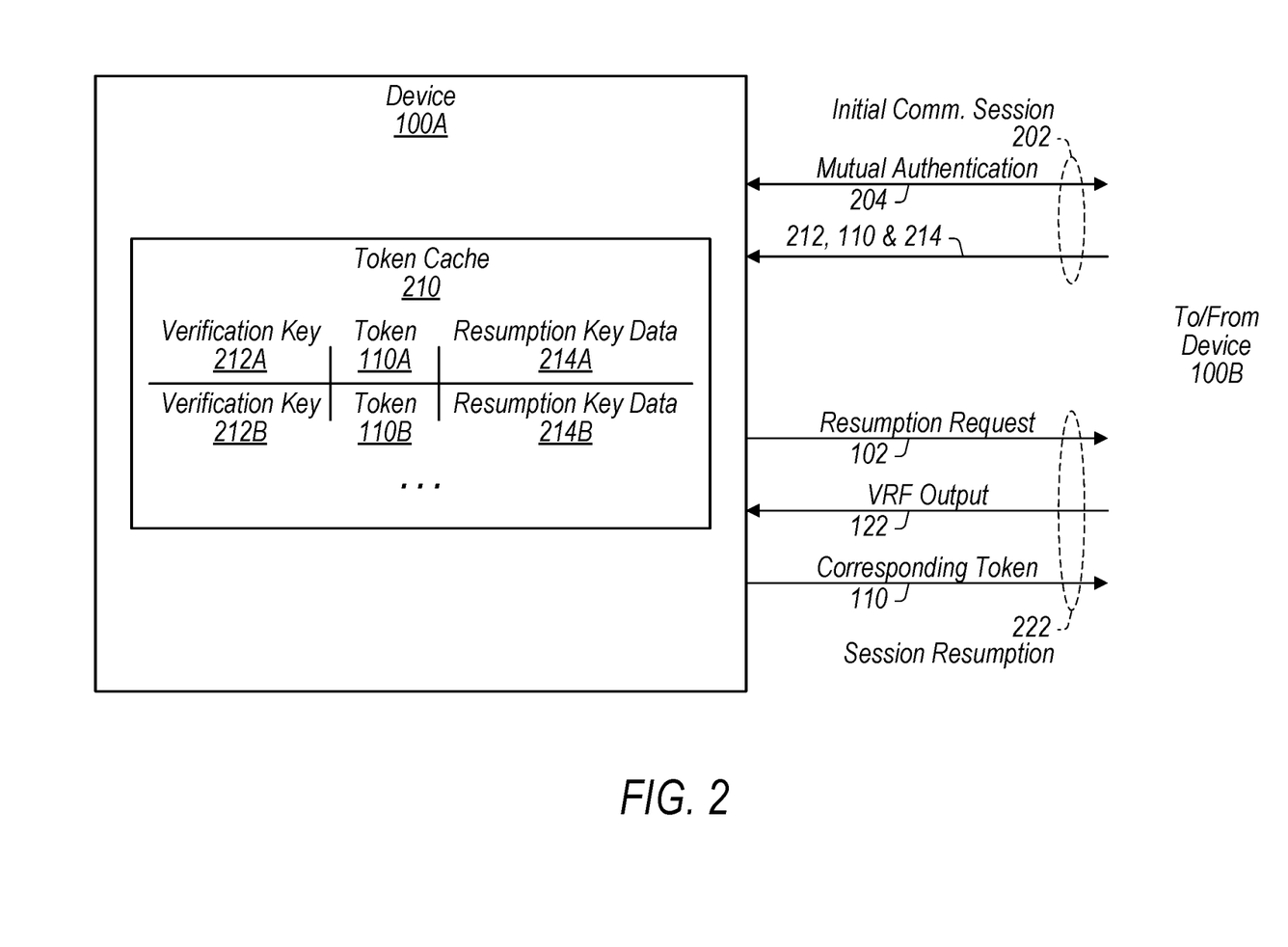
FIG. 2 is a block diagram illustrating an example of a device participating in the session resumption according to some embodiments.

Turning now to FIG. 2, a block diagram of components in device 100A is shown. In the illustrated embodiment, device 100A includes a token cache 210, which includes multiple tokens 110A-B, verification keys 212A-B, and resumption key data 214A-B. In other embodiments, cache 210 may include more (or less) components than shown.

Token cache 210, in various embodiments, stores tokens 110 received over time as device 100A establishes communication sessions with various devices 100B. As shown, each token 110 may be stored with a respective verification key 212 associated with the device 100B that provided the token 110. As shown, each entry in cache 210 may also include additional metadata usable by device 100A to resume a communication session, such as resumption key data 214, which may correspond to metadata included a token 110. In order to protect a given token 110's contents, in some embodiments, the issuing device 100B may encrypt the token 110 (or at least a portion of its contents) using a key. In some embodiments the key is a symmetric key known only to that device 100B. The key, however, can be any suitable type of key (e.g., a public key of a public key pair, etc.). In doing so, device 100B may prevent, for example, a third party from snooping the token contents or device 100A from attempting to alter the contents. As a result, device 100A may store a local, separate copy of this session resumption metadata, which device 100A may obtain during an initial communication session 202 along with a token 110 and verification key 212.

In the illustrated embodiment, devices 100A and 100B initially establish trust during an initial communication session 202 in which a mutual authentication 204 is performed. This authentication 204 may be implemented in any suitable manner. For example, devices 100A and 100B may authenticate one another by exchanging digital certificates issued by trusted certificate authorities. Devices 100A and 100B may then use the corresponding public keys included in the certificates by exchanging, for example, digital signatures in a challenge-response exchange using digital signature algorithm (DSA) or elliptic curve DSA (ECDSA). As another example, device 100A and 100B may authenticate one another. In some implementations, the device 100A and 100B may authenticate each other using a sign and message authentication code (SIGMA) exchange. In other embodiments, other forms of authentication credentials may be exchanged. Based on authentication 204 being successful, in various embodiments, devices 100A and 100B may also establish a shared cryptographic key used to encrypt communications such as using Elliptic-curve Diffie-Hellman (ECDH) to establish an advanced encryption standard (AES) key. These encrypted communications may then be used by device 100B to convey a verification key 212 and token 110 to device 100A. In some embodiments, this shared cryptographic key may be stored in cache 210 as resumption key data 214 and included in token 110. In other embodiments, however, the shared cryptographic key may merely be used to securely communicate key data 214, which may be another cryptographic key (or key data for deriving a cryptographic key) that is also included in token 110.

When a session resumption 222 is later performed, in various embodiments, device 100A uses a VRF output 122 received from device 100B to identify the relevant cached token 110 corresponding that device 100B. In particular, device 100 may attempt to verify the VRF output 122 using each of the cached verification keys 212 in cache 210. If device 100A is able to identify a particular verification key 212 (e.g., key 212B) that is able to correctly verify the received VRF output 122, device 100A may then provide the corresponding token 110 (e.g., token 110B) to device 100B and use the corresponding resumption key data 214 (e.g., key data 214B) to exchange secure, encrypted communications with device 100B. In some embodiments, in response to receiving token 110, device 100B may decrypt the encrypted metadata included in the token 110 with its symmetric cryptographic key and use the corresponding copy of key data 214 included in the decrypted metadata to encrypt communications being exchanged with device 100A. If, however, device 100A is unable to identify a verification key 212 in cache 210 that produces a successful verification, device 100A may instruct device 100B to perform another mutual authentication 204. An example of this communication exchange for a session resumption 222 will now be discussed with FIG. 3.

Figure 3:
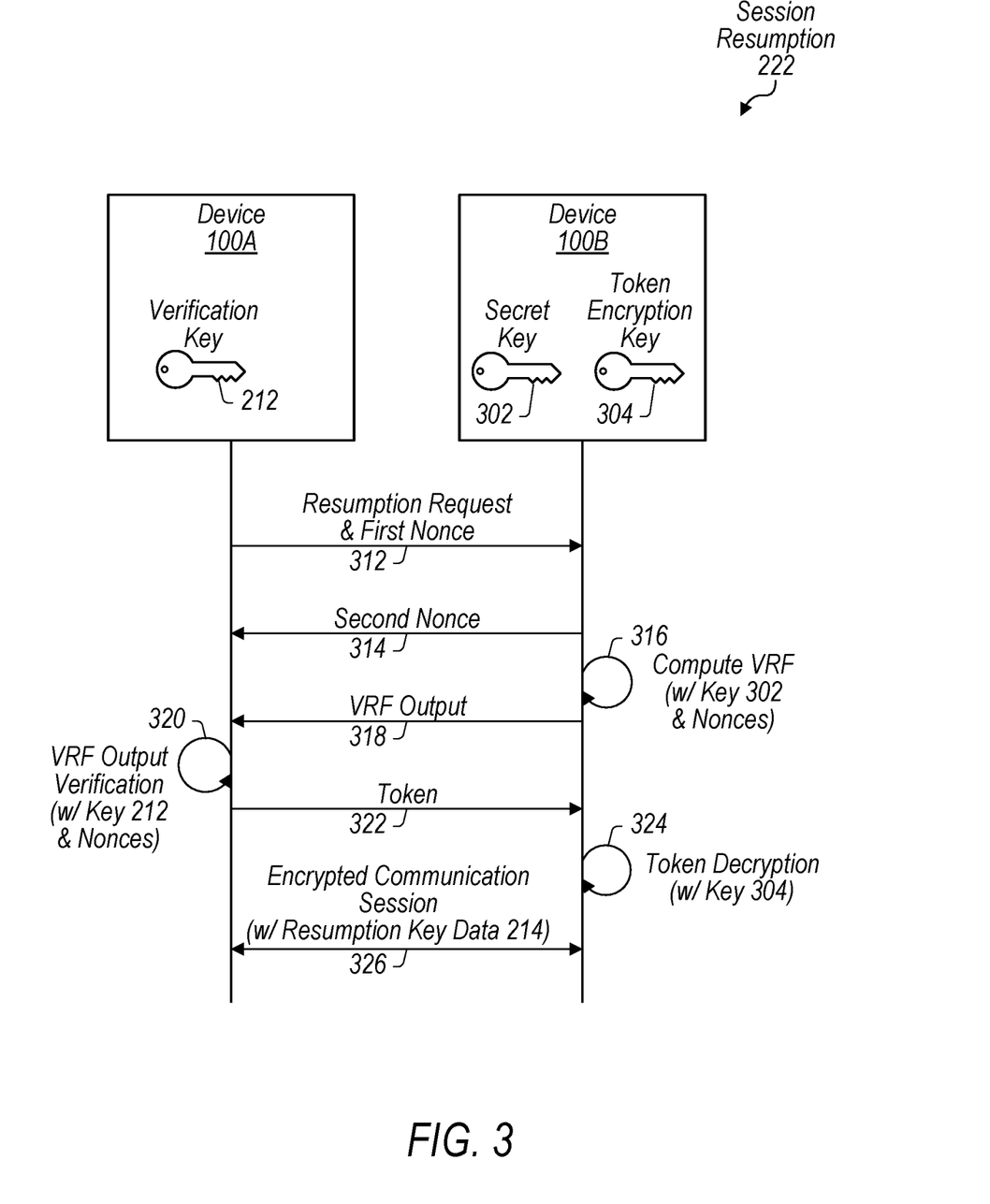
FIG. 3 is a communication diagram illustrating an example of a session resumption according to some embodiments.

Turning now to FIG. 3, a communication diagram of a session resumption 222 is depicted. As shown, device 100A may initially store a verification key 212 received from an earlier communication session 202. Device 100B may also store a secret key 302 corresponding to verification key 212 and a token encryption key 304 used to encrypt the contents of token 110. In some embodiments, devices 100A and 100B may be provisioned with other information prior to the performance of session resumption 222. In some embodiments, session resumption 222 may be implemented differently than shown—e.g., devices 100A and 100B may exchange additional (or different) information, perform additional (or different) steps, steps may be performed concurrently or in a different order, etc.

As shown, session resumption 222 may begin at 312 with device 100A providing a session resumption request 102 and a first nonce to device 100B. In various embodiments, this nonce is a random value generated by device 100A at 312 for this session resumption 222 in order to ensure that device 100B is not replaying a VRF output 122 from another session resumption. At 314, device 100B may generate a second nonce and provide it to device 100A in order to ensure device 100A is not the sole contributor to the VRF input. At 316, device 100B may use its secret key 302 and these exchanged nonces as inputs to compute VRF 120 to generate a VRF output 122. In some embodiments, computing VRF 120 may include concatenating the two nonces together and applying hash function (e.g., secure hash algorithm (SHA)) to the concatenated nonces to produce output 122. At 318, device 100B may convey this VRF output 122 to device 100A.

At 320, device 100A may compute a verification function that uses its verification key 212 along with the first and second nonces to verify this received VRF output 122. In some embodiments, this verification may also include concatenating the two nonces and applying a hash function to them to produce a corresponding hash value input into the verification function. If the verification fails, device 100A may abort session resumption 222—and, in some embodiments, request that device 100A perform another authentication 204. If the verification is successful, at 322, device 100A may provide its token 110 to device 100B. At 324, device 100B may use token encryption key 304 to decrypt the token 110 and obtain its metadata including resumption key data 214. At 326, device 100B may then use this key data 214 to resume an encrypted communication session with device 100A.

Figure 4A:
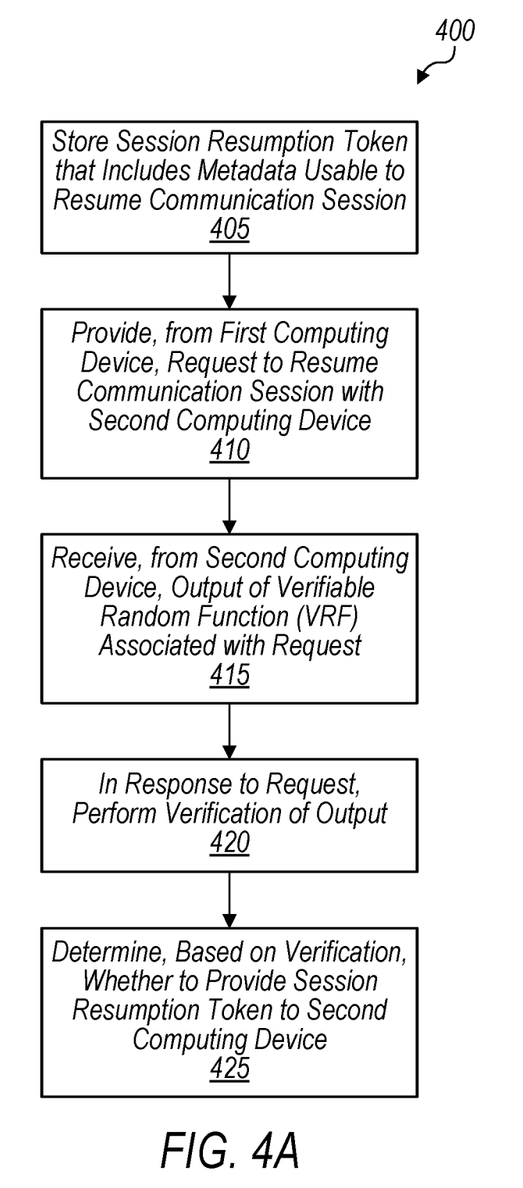
FIGS. 4A and 4B are flow diagrams illustrating examples of methods performed by devices participating in the session resumption according to some embodiments.

Turning now to FIG. 4A, a flow diagram of a method 400 is depicted. Method 400 is one embodiment of a method performed by a first computing device storing a session resumption token such as a device 100A. In some instances, performance of method 400 may improve the security of the session resumption and/or privacy of participating devices.

In step 405, the first computing device stores a session resumption token (e.g., token 110) that includes metadata usable to resume a communication session. In various embodiments, prior to storing the session resumption token, the first computing device establishes an initial communication session (e.g., initial session 202) with the second computing device. In such an embodiment, the initial communication session includes performing a mutual authentication (e.g., mutual authentication 204) with the second computing device and, based on the mutual authentication, receiving the session resumption token from the second computing device. In some embodiments, the metadata included in the session resumption token includes key data for encrypting the communication session. In some embodiments, the session resumption token is encrypted by the second computing device using a cryptographic key (e.g., token encryption key 304) unknown to the first computing device, and the storing includes storing a separate copy of the key data (e.g., resumption key data 214) for the first computing device to encrypt the communication session.

In step 410, the first computing device provides a request (e.g., resumption request 102) to resume the communication session with a second computing device (e.g., device 100B).

In step 415, the first computing device receives, from the second computing device, an output (e.g., output 122) of a verifiable random function (VRF) (e.g., VRF 120) associated with the request.

In step 420, the first computing device performs, in response to the request, a verification of the output. In various embodiments, the first computing device stores a plurality of session resumption tokens (e.g., in token cache 210) associated with a plurality of computing devices. In such an embodiment, the first computing device uses the output of the VRF to identify one of the plurality of session resumption tokens as being associated with the second computing device and provides the identified session resumption token to the second computing device. In some embodiments, the first computing device exchanges information (e.g., first and second nonces in FIG. 3) with the second computing device to be input into the VRF. In some implementations of such an embodiment, performing the verification includes applying a hash function to the information to generate a hash value and performing a verification function that receives as inputs the hash value, the output of the VRF, and a verification key (e.g., verification 212) corresponding to a secret key (e.g., secret key 302) used by the second computing device to perform the VRF. In some implementations of such an embodiment, performing the verification includes applying a transformation to the information to generate a transformed value and performing a verification function that receives as inputs the transformed value, the output of the VRF, and a verification key (e.g., verification 212) corresponding to a secret key (e.g., secret key 302) used by the second computing device to perform the VRF.

In step 425, the first computing device determines, based on the verification, whether to provide the session resumption token to the second computing device. In various embodiments, in response to determining to provide the session resumption token, the first computing device provides the session resumption token to the second computing device and resumes the communication session with the second computing device including encrypting the communication session using the key data. In some embodiments, in response to determining to not provide the session resumption token based on the verification failing, the first computing device instructs the second computing device to perform an authentication with the first computing device.

Figure 4B:
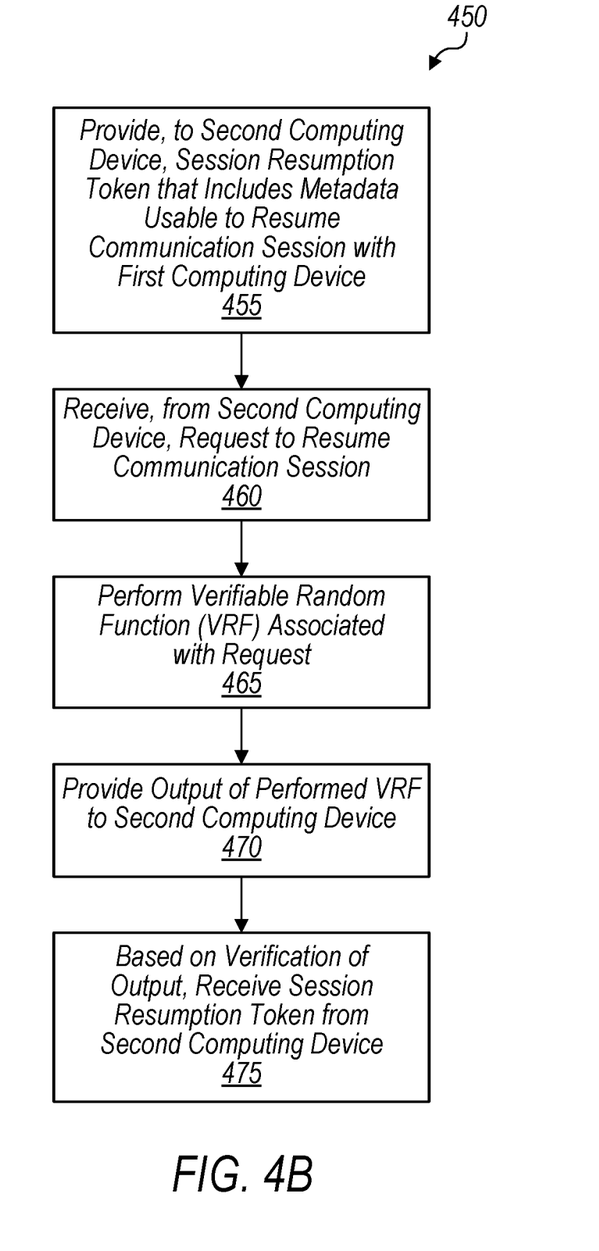

Turning now to FIG. 4B, a flow diagram of a method 450 is depicted. Method 450 is one embodiment of a method performed by a first computing device providing a session resumption token such as a device 100B. In some instances, performance of method 450 may improve the security of the session resumption and/or privacy of participating devices.

In step 455, the first computing device provides, to a second computing device, a session resumption token (e.g., token 110) that includes metadata usable to resume a communication session with the first computing device. In various embodiments, prior to providing the session resumption token, the first computing device establishes an initial communication session (e.g., initial session 202) with the second computing device. In such an embodiment, the initial communication session includes performing a mutual authentication (e.g., mutual authentication 204) with the second computing device and, based on the mutual authentication being successful, generating the session resumption token. In some embodiments, the metadata included in the session resumption token includes a cryptograph key for encrypting the communication session. In some embodiments, the metadata included in the session resumption token includes key data for deriving a cryptographic key. In some embodiments, prior to providing the session resumption token, the first computing device encrypts the included metadata with a symmetric cryptographic key (e.g., token encryption key 304).

In step 460, the first computing device receives, from the second computing device, a request (e.g., resumption request 102) to resume the communication session.

In step 465, the first computing device performs a verifiable random function (VRF) (e.g., VRF 120) associated with the request. In various embodiments, the first computing device provides a verification key (e.g., verification key 212) with the session resumption token, and the verification key is usable to verify the provided output. In such an embodiment, the first computing device uses a secret key (e.g., secret key 302) corresponding to the verification key to perform the VRF to generate the output. In some embodiments, the first computing device exchanges information (e.g., the first and second nonces in FIG. 3) with the second computing device. In such an embodiment, performing the VRF includes applying a hash function to the information to generate a hash value and determining the output using the hash value and the secret key.

In step 470, the first computing device provides an output (e.g., output 122) of the performed VRF to the second computing device. In various embodiments, in response to a verification of the provided output failing, the first computing device receives a request to perform a mutual authentication with the second computing device.

In step 475, the first computing device receives, based on a verification of the output, the session resumption token from the second computing device. In various embodiments, in response to receiving the session resumption token, the first computing device resumes the communication session with the second computing device including encrypting the communication session using the metadata included in the session resumption token. In some embodiments, in response to receiving the session resumption token, the first computing device decrypts the encrypted metadata with the symmetric cryptographic key, and the decrypted metadata is used to encrypt the communication session.

Exemplary Computer System

Figure 5:
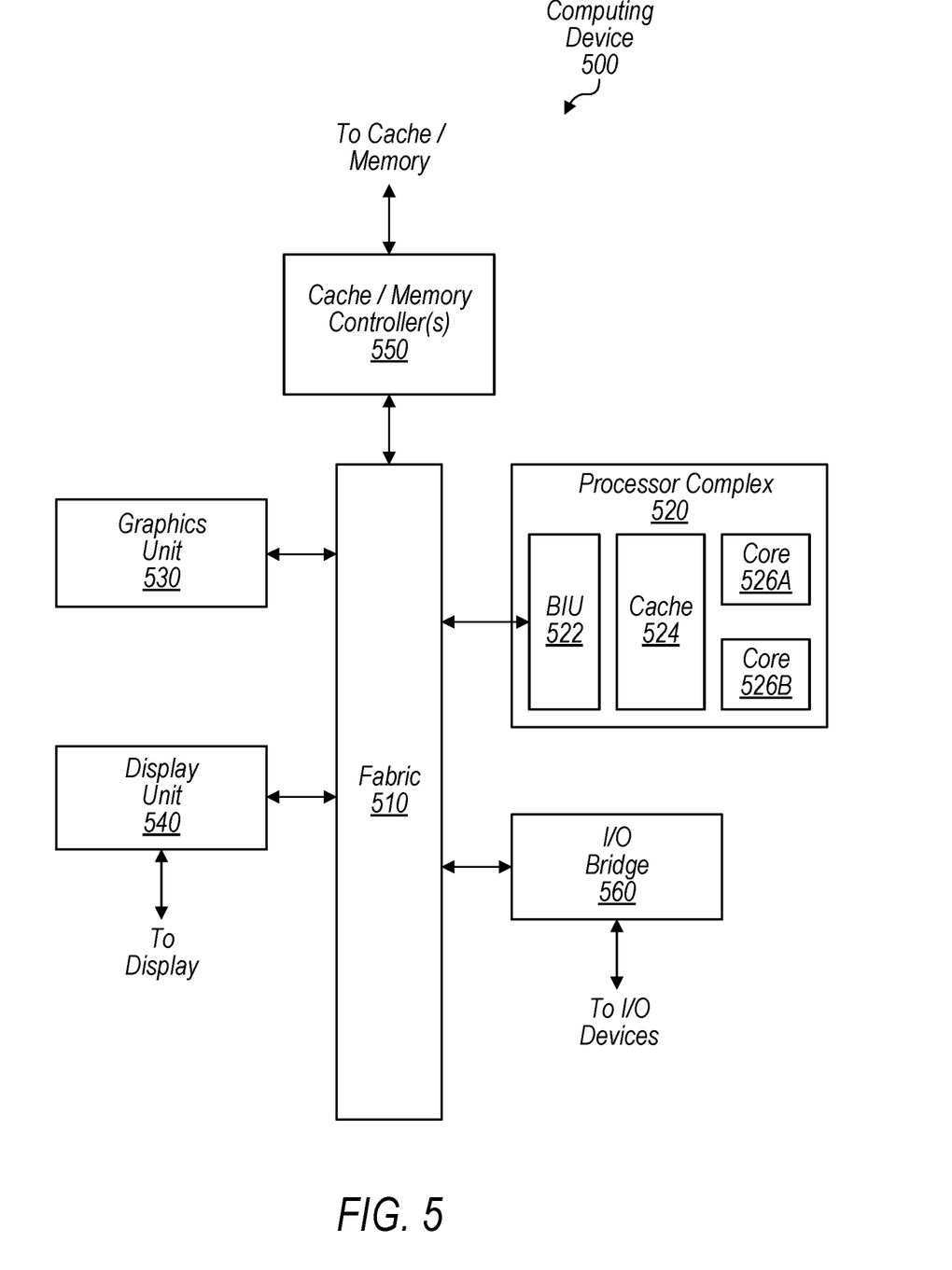
FIG. 5 is a block diagram illustrating an exemplary computer system according to some embodiments.

Turning now to FIG. 5, a block diagram illustrating an exemplary embodiment of a computing device 500, which may implement functionality of device 100A or 100B, is shown. Device 500 may correspond to any suitable computing device such as a server system, personal computer system, desktop computer, laptop or notebook computer, mainframe computer system, tablet computer, handheld computer, workstation, network computer, a mobile phone, music player, personal data assistant (PDA), wearable device, internet of things (IoT) device, accessory device, peripheral device, etc. In the illustrated embodiment, device 500 includes fabric 510, processor complex 520, graphics unit 530, display unit 540, cache/memory controller 550, input/output (I/O) bridge 560. In some embodiments, elements of device 500 may be included within a system on a chip (SOC). In some embodiments, computing device 500 may be implemented differently than shown as lacking a display unit, graphics unit, etc.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally. As used herein, the term "coupled to" may indicate one or more connections between elements, and a coupling may include intervening elements. For example, in FIG. 5, graphics unit 530 may be described as "coupled to" a memory through fabric 510 and cache/memory controller 550. In contrast, in the illustrated embodiment of FIG. 5, graphics unit 530 is "directly coupled" to fabric 510 because there are no intervening elements.

In the illustrated embodiment, processor complex 520 includes bus interface unit (BIU) 522, cache 524, and cores 526A and 526B. In various embodiments, processor complex 520 may include various numbers of processors, processor cores and/or caches. For example, processor complex 520 may include 1, 2, or 4 processor cores, or any other suitable number. In one embodiment, cache 524 is a set associative L2 cache. In some embodiments, cores 526A and/or 526B may include internal instruction and/or data caches. In some embodiments, a coherency unit (not shown) in fabric 510, cache 524, or elsewhere in device 500 may be configured to maintain coherency between various caches of device 500. BIU 522 may be configured to manage communication between processor complex 520 and other elements of device 500. Processor cores such as cores 526 may be configured to execute instructions of a particular instruction set architecture (ISA), which may include operating system instructions and user application instructions. These instructions may be stored in computer readable medium such as a memory coupled to memory controller 550 discussed below.

Graphics unit 530 may include one or more processors and/or one or more graphics processing units (GPU's). Graphics unit 530 may receive graphics-oriented instructions, such as OPENGL®, Metal, or DIRECT3D® instructions, for example. Graphics unit 530 may execute specialized GPU instructions or perform other operations based on the received graphics-oriented instructions. Graphics unit 530 may generally be configured to process large blocks of data in parallel and may build images in a frame buffer for output to a display. Graphics unit 530 may include transform, lighting, triangle, and/or rendering engines in one or more graphics processing pipelines. Graphics unit 530 may output pixel information for display images.

Display unit 540 may be configured to read data from a frame buffer and provide a stream of pixel values for display. Display unit 540 may be configured as a display pipeline in some embodiments. Additionally, display unit 540 may be configured to blend multiple frames to produce an output frame. Further, display unit 540 may include one or more interfaces (e.g., MIPI® or embedded display port (eDP)) for coupling to a user display (e.g., a touchscreen or an external display).

Cache/memory controller 550 may be configured to manage transfer of data between fabric 510 and one or more caches and/or memories. For example, cache/memory controller 550 may be coupled to an L3 cache, which may in turn be coupled to a system memory. In other embodiments, cache/memory controller 550 may be directly coupled to a memory. In some embodiments, cache/memory controller 550 may include one or more internal caches. Memory coupled to controller 550 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 550 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by processor complex 520 to cause device 500 to perform functionality described herein.

I/O bridge 560 may include various elements configured to implement universal serial bus (USB) communications, security, audio, and/or low-power always-on functionality, for example. I/O bridge 560 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 560. For example, these devices may include various types of wireless communication (e.g., Wi-Fi™, Bluetooth®, cellular, global positioning system, etc.), additional storage (e.g., RAM storage, solid state storage, or disk storage), user interface devices (e.g., keyboard, microphones, speakers, etc.), etc.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The present disclosure includes references to "an embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

What is claimed is:

1. A non-transitory computer readable medium having program instructions stored therein that are executable by a first computing device to cause the first computing device to perform operations comprising:
   storing a plurality of session resumption tokens associated with a plurality of computing devices, wherein the plurality of session resumption tokens includes a session resumption token that includes metadata usable to resume a communication session with a second computing device;
   providing, from the first computing device, a request to resume the communication session with the second computing device;
   receiving, from the second computing device, an output of a verifiable random function (VRF) associated with the request;
   in response to the request, performing a verification of the output; and
   utilizing the verified output of the VRF to identify one of the plurality of session resumption tokens as being associated with the second computing device; and
   providing the identified session resumption token to the second computing device.

2. The non-transitory computer readable medium of claim 1, wherein the operations further comprise:
   prior to storing the session resumption token, establishing an initial communication session with the second computing device, wherein the initial communication session includes:
      performing a mutual authentication with the second computing device; and
      based on the mutual authentication, receiving the session resumption token from the second computing device.

3. The non-transitory computer readable medium of claim 1,
   wherein the metadata included in the session resumption token includes key data for encrypting the communication session.

4. The non-transitory computer readable medium of claim 3, wherein the operations further comprise:
   resuming the communication session with the second computing device including encrypting the communication session using the key data.

5. The non-transitory computer readable medium of claim 3, wherein the session resumption token is encrypted by the second computing device using a cryptographic key unknown to the first computing device; and
   wherein the storing includes storing a separate copy of the key data for the first computing device to encrypt the communication session.

6. The non-transitory computer readable medium of claim 1, wherein the operations further comprise:
   in response to determining to not provide the session resumption token based on a subsequent verification failing, instructing the second computing device to perform an authentication with the first computing device.

7. The non-transitory computer readable medium of claim 1, wherein the operations further comprise:
   storing a respective verification key for each of the plurality of session resumption tokens; and
   wherein performing the verification of the output includes:
      determining whether a successful verification is possible utilizing any of the verification keys; and
      in response to determining that a successful verification is possible utilizing one of the verification keys, identifying the session resumption token corresponding to the one verification key as being associated with the second computing device.

8. The non-transitory computer readable medium of claim 1, wherein the operations further comprise:
   exchanging information with the second computing device to be input into the VRF; and
   wherein performing the verification includes:
      applying a hash function to the information to generate a hash value; and
      performing a verification function that receives as inputs the hash value, the output of the VRF, and a verification key corresponding to a secret key used by the second computing device to perform the VRF.

9. A first computing device, comprising:
   one or more processors; and
   memory having program instructions executable by the one or more processors to cause the first computing device to perform operations including:
      storing a plurality of session resumption tokens associated with a plurality of computing devices, wherein the plurality of session resumption tokens includes a session resumption token that includes metadata usable to resume a communication session with a second computing device;
      providing, from the first computing device, a request to resume the communication session with the second computing device;
      receiving, from the second computing device, an output of a verifiable random function (VRF) associated with the request;
      in response to the request, performing a verification of the output; and utilizing the verified output of the VRF to identify one of the plurality of session resumption tokens as being associated with the second computing device; and providing the identified session resumption token to the second computing device.

10. The first computing device of claim 9, wherein the operations include:

prior to storing the session resumption token, establishing an initial communication session with the second computing device, wherein the establishing includes:

performing an authentication with the second computing device; and receiving the session resumption token from the second computing device, wherein the metadata included in the session resumption token includes key data for encrypting the resumed communication session.

11. The first computing device of claim 9, wherein performing the verification includes:

applying a hash function to information exchanged with the second computing device to generate a hash value; and performing a verification function that receives as inputs the hash value, the output of the VRF, and a verification key corresponding to a secret key used by the second computing device to perform the VRF.

12. The first computing device of claim 9, wherein the operations include:

resuming the communication session with the second computing device including encrypting the communication session using key data associated with the session resumption token.

13. The first computing device of claim 9, wherein the operations include:

based on a subsequent verification failing:

determining to not provide the session resumption token; and instructing the second computing device to perform an authentication with the first computing device.

14. A method, comprising:

storing, by a first computing device, a plurality of session resumption tokens associated with a plurality of computing devices, wherein the plurality of session resumption tokens includes a session resumption token that includes metadata usable to resume a communication session with a second computing device;

providing, from the first computing device, a request to resume the communication session with the second computing device;

receiving, by the first computing device from the second computing device, an output of a verifiable random function (VRF) associated with the request;

in response to the request, the first computing device performing a verification of the output; and utilizing, by the first computing device, the verified output of the VRF to identify one of the plurality of session resumption tokens as being associated with the second computing device; and providing, by the first computing device, the identified session resumption token to the second computing device.

15. The method of claim 14, wherein performing the verification includes:

applying a hash function to information exchanged with the second computing device to generate a hash value; and performing a verification function that receives as inputs the hash value, the output of the VRF, and a verification key corresponding to a secret key used by the second computing device to perform the VRF.

16. The method of claim 14, further comprising:

prior to storing the session resumption token, the first computing device establishing an initial communication session with the second computing device, wherein the establishing includes:

performing an authentication with the second computing device; and receiving the session resumption token from the second computing device, wherein the metadata included in the session resumption token includes key data for encrypting the resumed communication session.

17. The method of claim 14, further comprising:

resuming, by the first computing device, the communication session with the second computing device including encrypting the communication session using key data included in the metadata.

18. The method of claim 14, further comprising:

determining, by the first computing device based on a subsequent verification failing, to not provide the session resumption token; and instructing, by the first computing device, the second computing device to perform an authentication with the first computing device.

* * * * *